United States Patent
Suresh et al.

(10) Patent No.: US 10,884,960 B2
(45) Date of Patent: Jan. 5, 2021

(54) OFFLOADING DATA MOVEMENT FOR PACKET PROCESSING IN A NETWORK INTERFACE CONTROLLER

(71) Applicant: Cisco Technology, Inc., San Jose, CA (US)

(72) Inventors: Tanjore K. Suresh, Fremont, CA (US); David S. Walker, San Jose, CA (US); Ravi Shankar Palagummi, San Jose, CA (US); RaviKiran Kaidala Lakshman, San Jose, CA (US); Kar Wai Kam, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/389,040

(22) Filed: Apr. 19, 2019

(65) Prior Publication Data
US 2020/0334184 A1    Oct. 22, 2020

(51) Int. Cl.
*G06F 13/28* (2006.01)
*G06F 13/42* (2006.01)

(52) U.S. Cl.
CPC .......... *G06F 13/28* (2013.01); *G06F 13/4282* (2013.01); *G06F 2213/0026* (2013.01)

(58) Field of Classification Search
CPC .................. G06F 13/28; G06F 13/4282; G06F 2213/0026
See application file for complete search history.

(56) References Cited

U.S. PATENT DOCUMENTS

| | | | |
|---|---|---|---|
| 6,157,955 A | 12/2000 | Narad et al. | |
| 6,321,323 B1* | 11/2001 | Nugroho | G06F 8/443 711/103 |
| 6,363,444 B1* | 3/2002 | Platko | G06F 13/28 709/208 |
| 9,553,808 B1* | 1/2017 | Sites | H04L 45/7457 |
| 9,916,269 B1 | 3/2018 | Machulsky et al. | |
| 2016/0127494 A1* | 5/2016 | Liu | H04L 67/2842 709/212 |
| 2018/0262468 A1* | 9/2018 | Kumar | H04L 63/0281 |
| 2019/0294570 A1 | 9/2019 | Singh et al. | |
| 2019/0347204 A1* | 11/2019 | Du | G06F 13/1663 |

FOREIGN PATENT DOCUMENTS

| | | |
|---|---|---|
| GB | 2544515 A | 5/2017 |
| TW | I394049 B | 4/2013 |

* cited by examiner

*Primary Examiner* — Idriss N Alrobaye
*Assistant Examiner* — Ronald T Modo
(74) *Attorney, Agent, or Firm* — Behmke Innovation Group LLC; James M. Behmke; James J. Wong

(57) ABSTRACT

In one embodiment, a direct memory access (DMA) controller within a host device obtains a packet to be processed by the host device, where the host device comprises a host processor, a network interface controller (NIC), and a co-processor of the NIC, and where the co-processor is configured to perform one or more specific packet processing operations. The DMA controller may then detect a DMA descriptor of the packet, and can determine, according to the DMA descriptor, how the packet is to be moved for processing within the host device. As such, the DMA controller may then move the packet, based on the determining, to one of either a host main memory, a NIC memory, or a co-processor memory of the host device.

20 Claims, 15 Drawing Sheets

| Bits | Field |
|---|---|
| 0–7 | Special Op Sub Code 1205 |
| 8–14 | Algorithm 1210 |
| 15 | |
| 16–22 | Reserved 1215 |
| 23–31 | |

Table 1200:

| 0 | 7 | 15 | 23 | 31 |
|---|---|---|---|---|
| Special Op Sub Code 1205 | | Algorithm 1210 | | Reserved 1215 |
| Key Store Reference 1220 | | | | |
| Second Source Address [31:0] 1225 | | | | |
| Second Source Address [63:32] 1230 | | | | |
| Other Information Required for Certain Sub Code and Algorithm 1235 | | | | |

FIG. 12

OFFLOADING DATA MOVEMENT FOR PACKET PROCESSING IN A NETWORK INTERFACE CONTROLLER

TECHNICAL FIELD

The present disclosure relates generally to computer networks, and, more particularly, to offloading data movement for packet processing (e.g., special purpose processing) in a network interface controller (NIC).

BACKGROUND

With the ever-increasing security features requirement on a network controller, the data movement between host device and memory (e.g., Random-Access Memory (RAM) such as Double Data Rate Synchronous Dynamic RAM, or "DDR SDRAM") attached to a Network Interface Controller (NIC) or a co-processor has also increased tremendously when compared to traditional network packet transmission and reception functions. The transmission and reception of packets in a traditional NIC, in particular, are enabled by hardware queues such as Work Queues (WQ), Receive Queues(RQ), and Completion Queues (CQ) to transmit, receive, and to indicate completion of an operation, respectively, without host processor element involvement.

However, while this model of transmission, reception, and completion indication is suitable for traditional non-secure network operation, this model is insufficient for completing specialized operations such as encryption or decryption before the packet needs to be transmitted or received without host processor involvement.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 12 illustrates an example special operation specific information format;

DESCRIPTION OF EXAMPLE EMBODIMENTS

Overview

According to one or more embodiments of the disclosure, a direct memory access (DMA) controller within a host device obtains a packet to be processed by the host device, where the host device comprises a host processor, a network interface controller (NIC), and a co-processor of the NIC, and where the co-processor is configured to perform one or more specific packet processing operations. The DMA controller may then detect a DMA descriptor of the packet, and can determine, according to the DMA descriptor, how the packet is to be moved for processing within the host device. As such, the DMA controller may then move the packet, based on the determining, to one of either a host main memory, a NIC memory, or a co-processor memory of the host device.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE 1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1A:
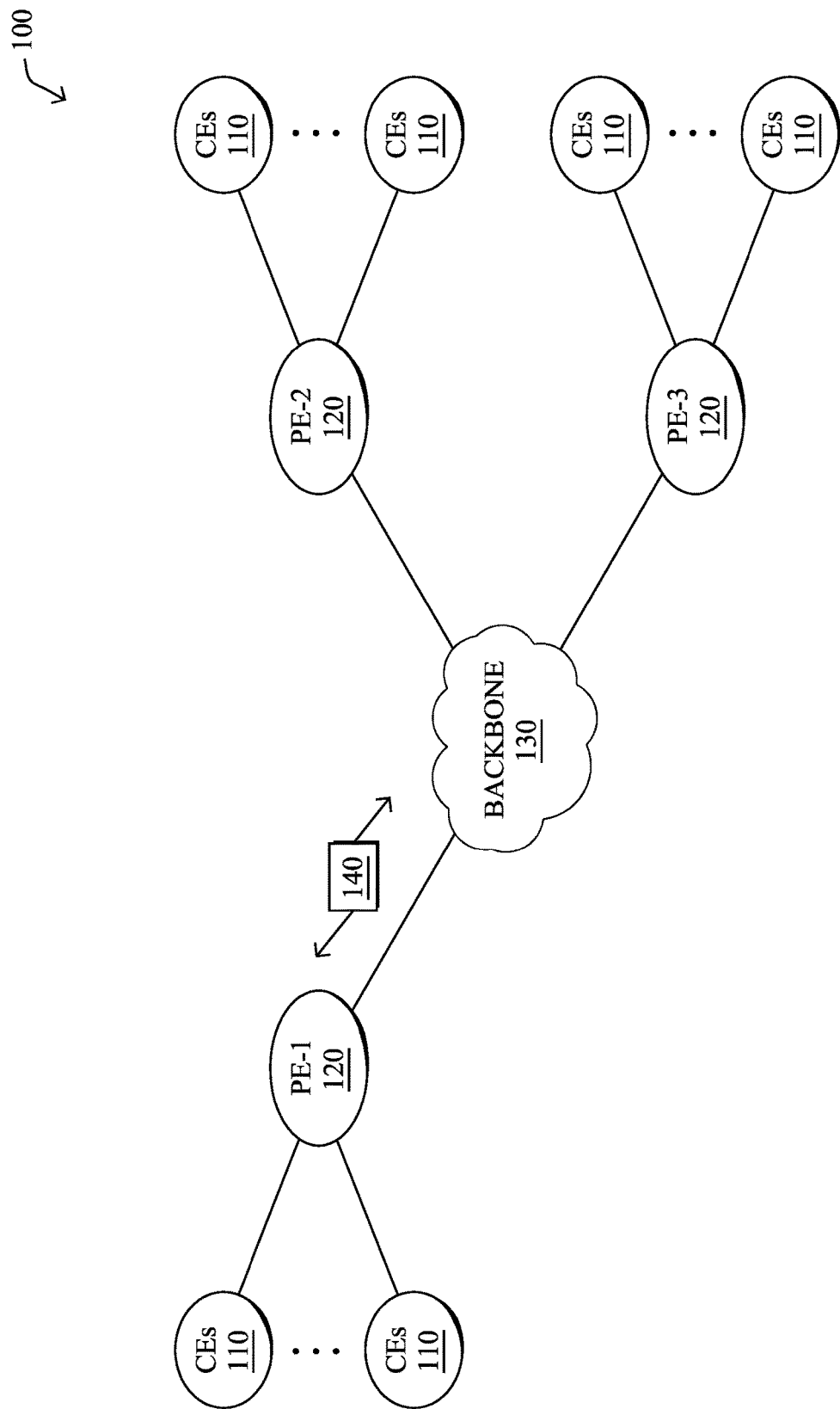
FIGS. 1A-1B illustrate an example computer network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/ Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN to a carrier network, via one or more links exhibiting very different network and service level agreement characteristics.

Figure 1B:
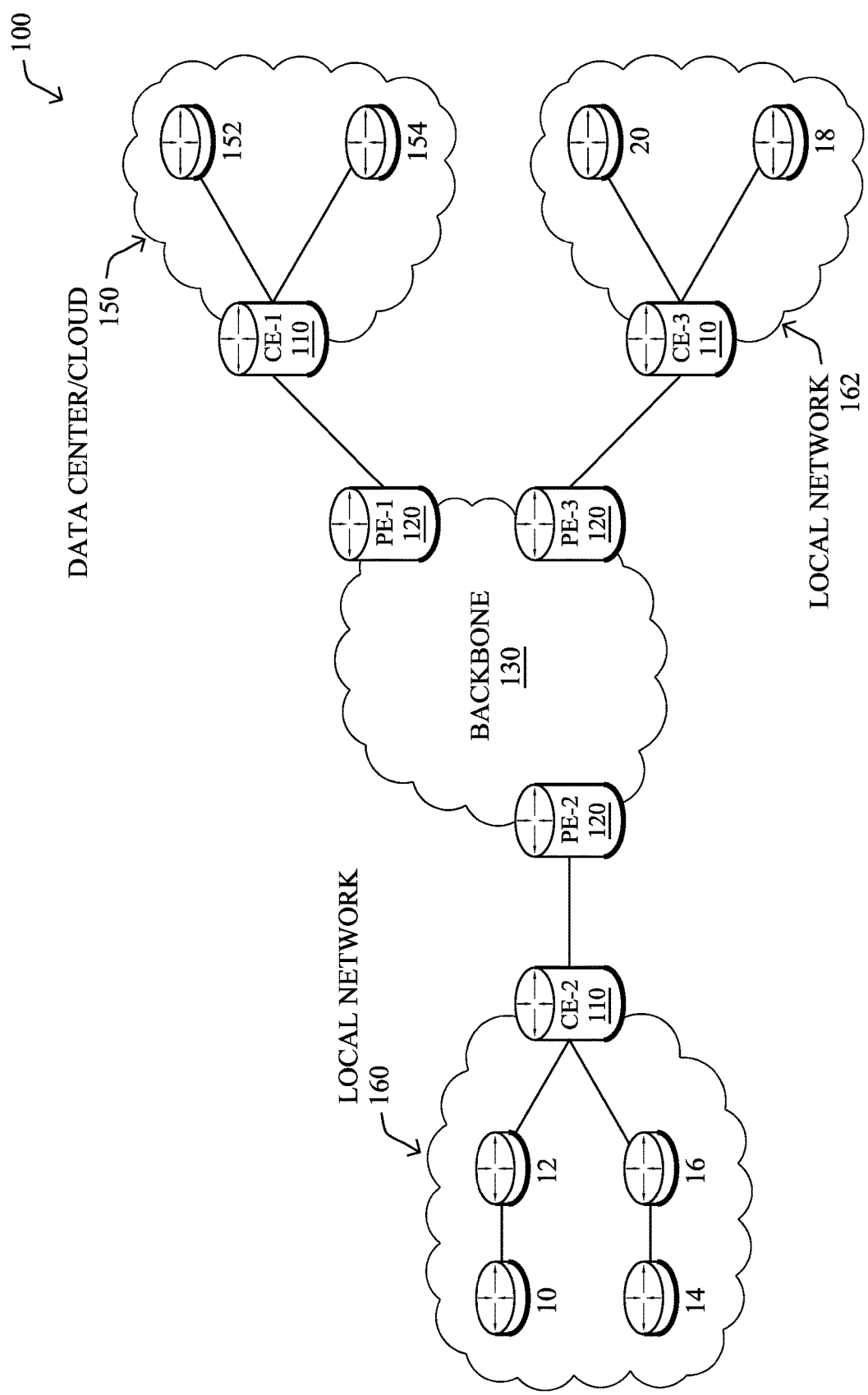

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Figure 2:
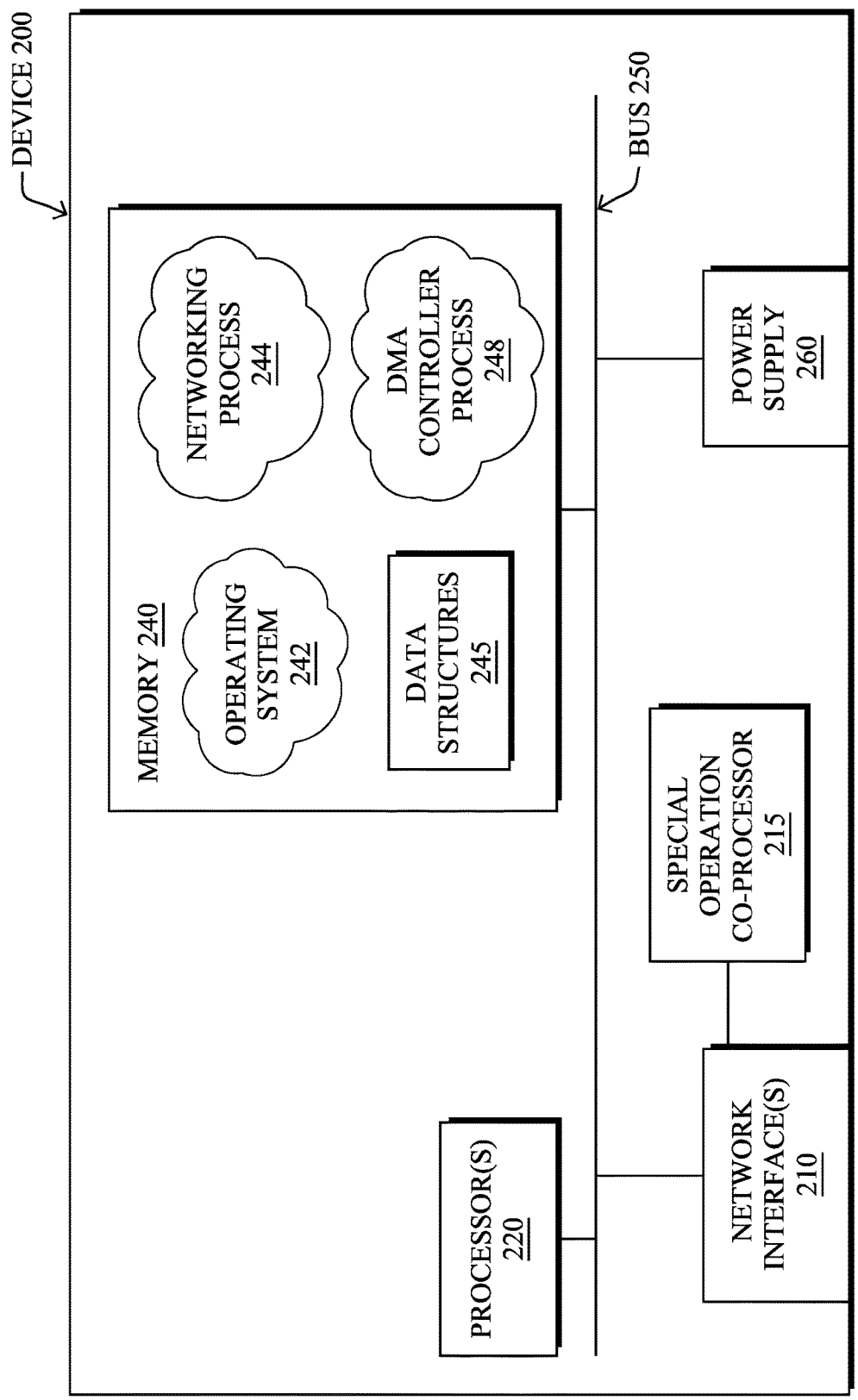
FIG. 2 illustrates an example network device/node.

FIG. 2 is a schematic block diagram of an example simplified node/device 200 (e.g., an apparatus) that may be used with one or more embodiments described herein, e.g., as any of the computing devices shown in FIGS. 1A-1B, any other computing device that supports the operations of network 100 (e.g., routers, switches, firewalls, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art. Also, as described below, a network interface 210 may comprise one or more co-processor units 215.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, among other things, invoking network operations in support of software processors and/or services executing on the device. These software processors and/or services may comprise networking process 244 (e.g., routing services, switching services, etc.) and illustratively, a direct memory access (DMA) process 248, as described herein, any of which may alternatively be located within individual network interfaces 210 and/or the co-processing units 215.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

—Offloading Data Movement for Packet Processing in a NIC—

As noted above, because of increasing requirements on computer networking devices (e.g., network controllers), the data movement between host device processing (e.g., a central CPU and main memory) and memory attached to a Network Interface Controller (NIC) or a co-processor has also increased tremendously. For instance, while the transmission and reception of packets in a traditional NIC, in particular, are enabled by hardware queues such as Work Queues (WQ), Receive Queues(RQ), and Completion Queues (CQ) to transmit, receive, and to indicate completion of an operation, respectively, without processor element involvement, this model is insufficient for completing specialized operations (e.g., secure operations, high-speed storage, high-speed video, etc.), before the packet needs to be transmitted or received without processor involvement.

The present disclosure, therefore, details how a co-processor attachment (e.g., peripheral component interconnect express (PCI-E)-based) and other hardware enhancements in the NIC can make data movement happen without any processor element involvement. The present disclosure also describes new hardware descriptor formats that enable such data movement with or without specialized operation before transmission or after reception and still enabling the host of a NIC to offload some of the cycle-intensive operation. As described below, various specific operations to be accomplished are identified and various directions for data movement in a typical network controller with special purpose co-processor are defined.

As detailed below, a generic Direct memory access (DMA) architecture is proposed, which accomplishes additional operations along with data movement to different destinations. (DMA, notably, is a feature of computer systems that allows certain hardware subsystems to access main system memory (random-access memory), independent of the central processing unit (CPU).) The techniques herein reduce the host processor's involvement, such as by using a ternary content-addressable memory (TCAM)-based method to route the data movement transaction posted from the co-processor directly to host memory. Examples of special operations that can be accomplished are such things as encryption/decryption, compression/de-compression, XOR/Erasure coding, and so on. Commercially available NIC's definition of descriptors for accomplishing the network transmission and receive functions are not sufficient to accomplish special purpose operations before transmission and/or after reception of packets from network, and as such, novel descriptors are also defined herein.

Said differently, traditional network controllers provide DMA engines to transmit packets, receive packets, and post completion for those requests. However, these traditional network controllers lack mechanisms to submit to a co-processor to avoid pre or post processing on the host processor in the transmit and receive path (e.g., encryption before the transmission of a packet and decryption after reception of a packet). That is, some applications have special purpose operations only, and data movement controls in a traditional network controller are incapable of offloading such special purpose operations to a co-processor. As such, the techniques herein provide a general purpose DMA engine that follows generic descriptor formats that can be used by the DMA engine to complement the network controller functionality to implement these different applications (e.g., encryption/decryption for IPsec, XOR/erasure coding for storage/RAID, duplication/de-duplication, compression/decompression for things such as video, and so on).

Specifically, according to one or more embodiments of the disclosure as described in detail below, a DMA controller within a host device obtains a packet to be processed by the host device, where the host device comprises a host processor, a network interface controller (NIC), and a co-processor of the NIC, and where the co-processor is configured to perform one or more specific packet processing operations. The DMA controller may then detect a DMA descriptor of the packet, and can determine, according to the DMA descriptor, how the packet is to be moved for processing within the host device. As such, the DMA controller may then move the packet, based on the determining, to one of either a host main memory, a NIC memory, or a co-processor memory of the host device.

Illustratively, the techniques described herein may be performed by hardware, software, and/or firmware, such as in accordance with a DMA controller process, which may include computer executable instructions executed by a processor to perform functions relating to the techniques described herein.

Figure 3:
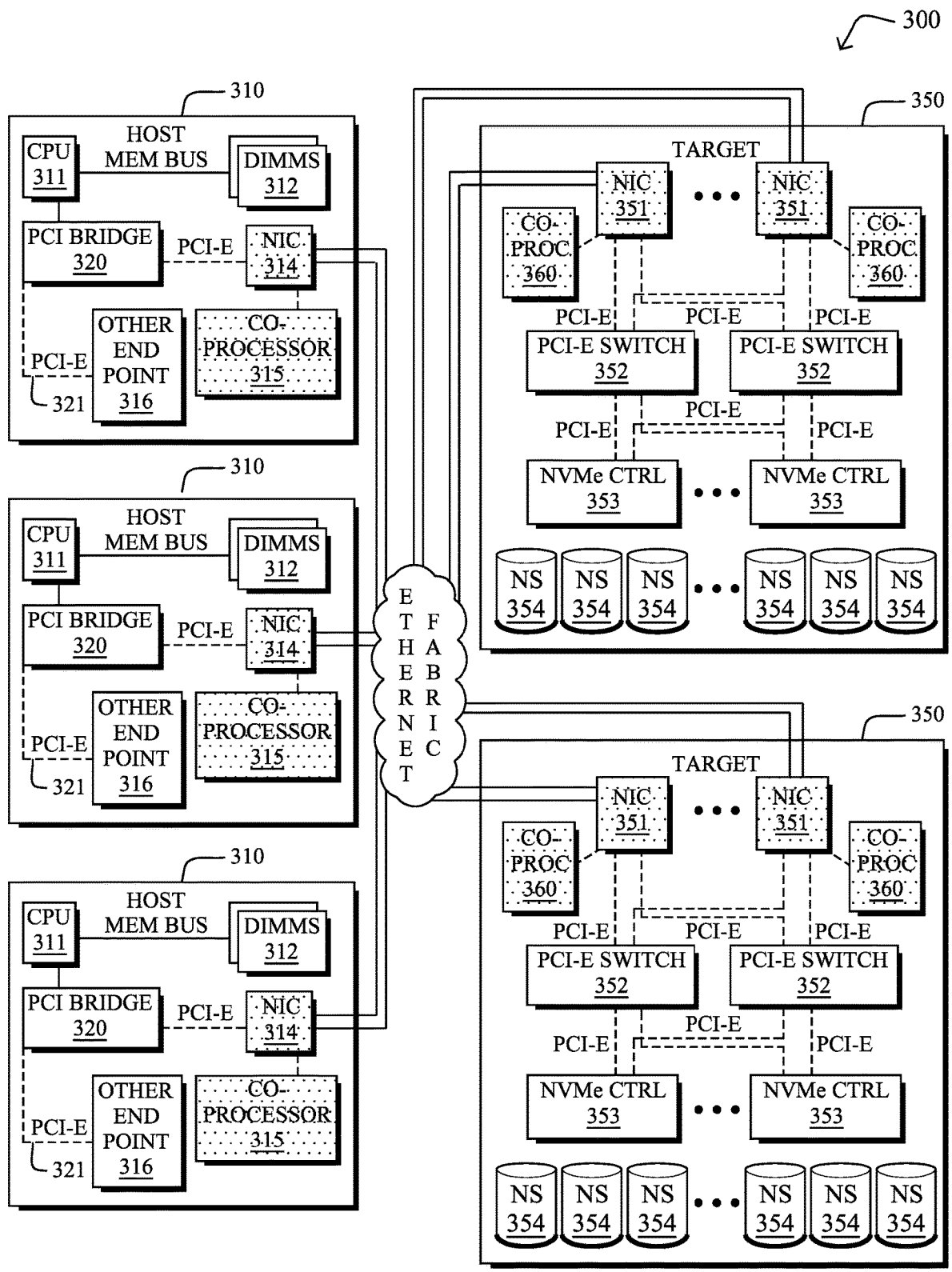
FIG. 3 illustrates another example computer network with devices interconnected via an Ethernet fabric, where at least one of the devices includes a network interface controller (NIC) that is configured to operate in accordance with an example embodiment.

Operationally, FIG. 3 depicts another example computer network 300 (e.g., as in network 100 above), but in greater device detail, where a network of devices are interconnected via an Ethernet fabric, and wherein at least one of the devices includes a network interface controller (NIC) that is configured to operate in accordance with an example embodiment. More specifically, multiple hosts 310 (e.g., device 200 of FIG. 2 above) are in potential or actual communication with one or more target devices 350 via a fabric, such as an Ethernet fabric 380. Each host 310 might include a central processing unit (CPU) 311 (e.g., processor 220 of FIG. 2 above), which is operably connected to memory in the form of, e.g., dual inline memory modules (DIMMS) 312 via, e.g., a memory bus, and which is also operably connected to a network interface controller (NIC) 314 (which may also be configured as a virtual interface card or "VIC") or other endpoint 316 via a PCI-E bridge 320 and corresponding PCI-E bus 321. As shown, the NIC 314 (e.g., network interface 210 of FIG. 2 above) are in communication with fabric 380, and may have an associated "co-processor" 315 (e.g., co-processor 215 as in FIG. 2 above). Target devices 350 may provide mass storage capability through, e.g., an NVMe (non-volatile memory express) infrastructure. In this regard, a target 350 may include one or more NICs 351 and co-processors 360, one or more PCI-E switches 352, and/or one or more NVMe controllers 353, which are configured to read from, and write to, non-volatile storage (NS) devices 354. Notably, in one or more particular embodiments of the present disclosure, the shaded components (NICs and co-processors) are the primary locations that benefit from the techniques herein.

Figure 4:
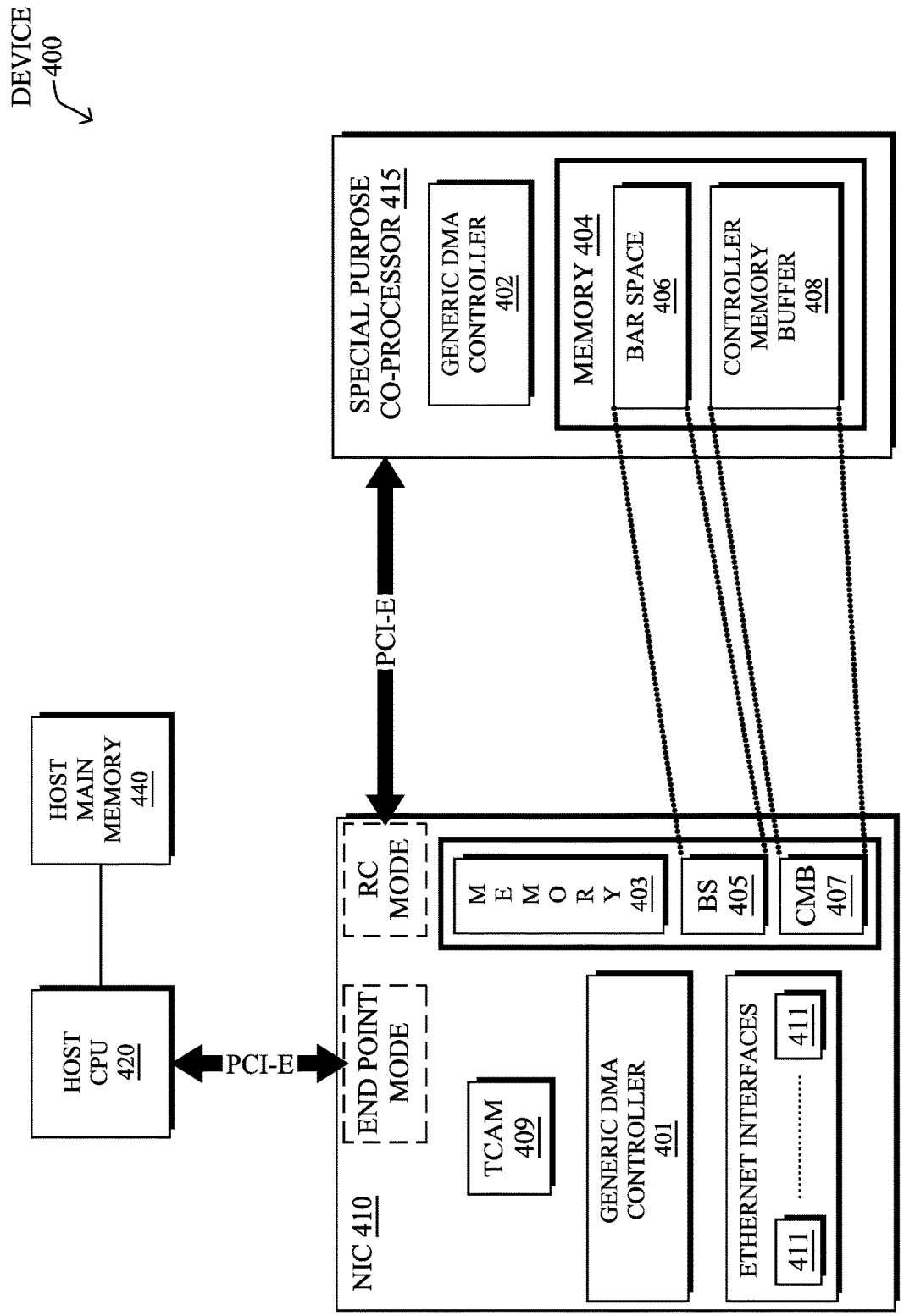
FIG. 4 illustrates another example of a network device, particularly configured for special purpose operation.

FIG. 4 illustrates an example of an apparatus (e.g., host device) 400 proposed for the special purpose queues and the associated descriptors described herein. Illustratively, a NIC 410 (e.g., 210 in FIG. 2 above or 314/351 of FIG. 3 above) is capable of communicating to the co-processor 415, which can complete some of the special purpose operations that are designed to different varieties of applications. For instance, such applications may include but are not limited to the following:

IPSec—Bump-in-the-wire implementation;
  RAID-5/RAID-6 implementation with XOR parity;
  Compression/decompression of data (e.g., could be payload compressed and sent out as well).
  And so on.

Note that the apparatus 400 shown in FIG. 4 and as the example herein is setup to show the mechanisms to implement the IPSec bump-in-the-wire implementation. However, though the present disclosure may make numerous references specific to demonstrating the implementation of IPSec, the techniques herein are not so limited, and other configurations (e.g., different rings) could be readily established that are specific for other applications mentioned in the above list or otherwise.

The device/host 400 is a differently detailed view of device 200 and 310 described above, with greater detail of the NIC 410 and co-processor 415. In particular, device 400 has a host processor/CPU 420 (e.g., 220/311 above) and host main memory 440 (e.g., 240/312 above). Connected via PCI-E is the NIC 410, which hosts a DMA controller 401, and has a memory 403 comprising BARs/BAR Space 405 and controller memory buffer (CMB) 407, as may be appreciated by those skilled in the art. Additionally, the NIC 410 has one or more network/ethernet interfaces 411, as shown. As described herein, the NIC may also operate data movement based on a TCAM 409.

Special purpose co-processor 415, connected to the NIC 410 illustratively with another PCI-E link, may also have a DMA controller 402, as well as a memory 404 and BAR space 406 and CMB 408, accordingly.

In this apparatus, the NIC 410 operates in End Point Mode, where it exposes the BARs 405 and has capability to expose controller memory buffer 407 as part of the BAR space, where it can host the special purpose WQs (rings) for transmission, RQs (rings) for reception of packets, and CQs (rings) to generate completions. The expectation of this implementation to carve out all the queues pertaining to the end point only on the Controller memory buffer so that data movement to the NIC and the co-processor will be minimized. Also, host processor involvement is reduced other than for updating the posted and fetch index of the queues.

—Typical Data Movement without Co-Processor—

Figure 5:
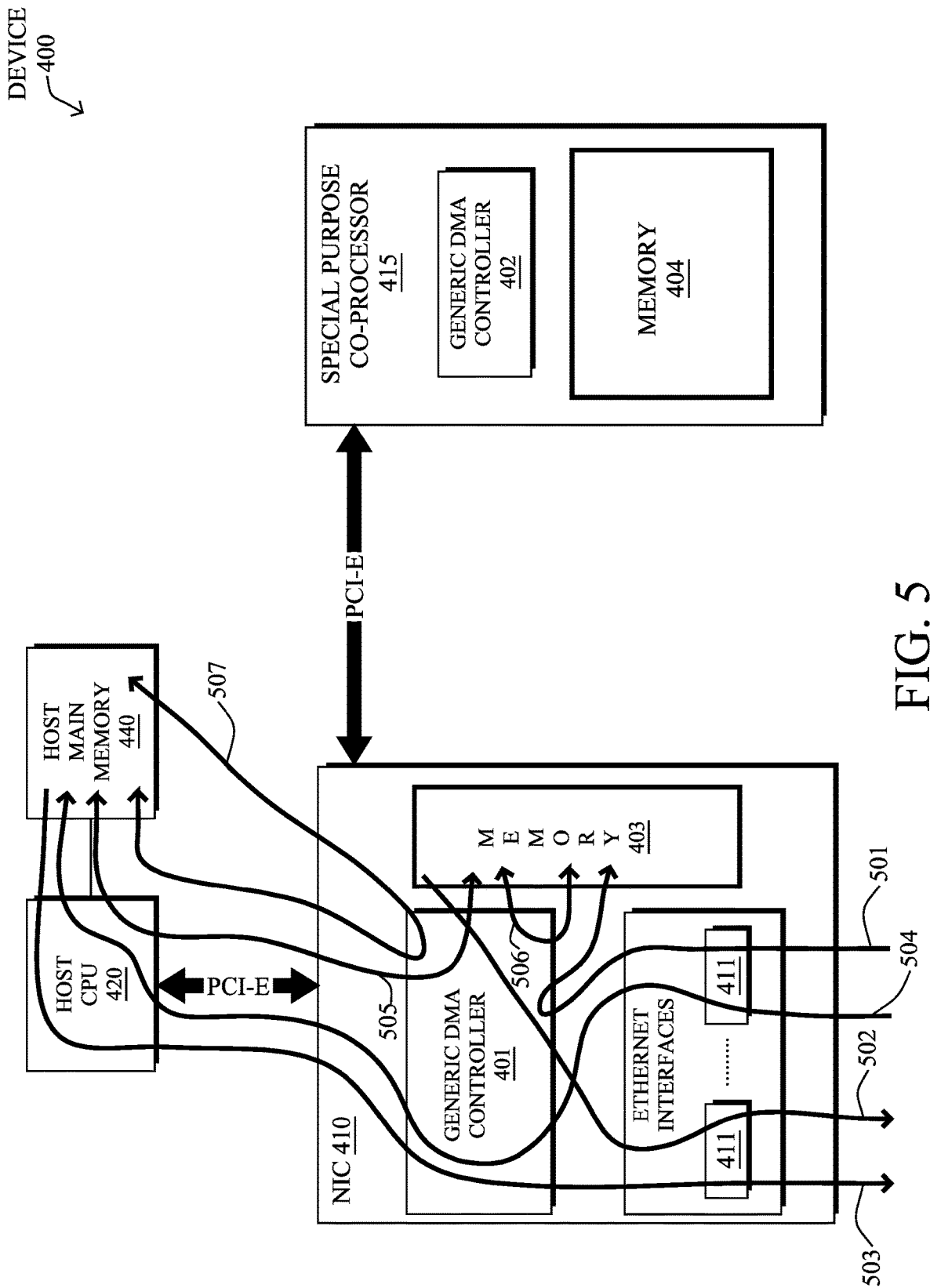
FIG. 5 illustrates an example of typical data movement directions of a NIC of the device of FIG. 4.

FIG. 5 illustrates typical data movement directions of a NIC 400. In particular, the following data movements could be initiated and completed by a standard NIC (or by the configuration herein when no special operations are programmed) for accomplishing the features of a network controller (i.e., rather than using software/host CPU, the NIC uses hardware to free up cycles):

501. Receive a packet into NIC memory 403.
502. Transmit a packet from NIC memory 403.
503. Transmit a packet from host memory 440.
504. Receive a packet into the host memory 440.
505. Move data from host memory 440 to NIC memory 403 and vice versa.
506. Move data from NIC memory 403 to NIC memory 403.
507. Move data from host memory 440 to host memory 440.

—Data Movement Enhanced with Special Operations—

According to the techniques herein, a generic DMA controller is implemented which can move data in all directions. Generally, the complexity of the DMA is enhanced to support a co-processor 415 which can do some offloading of cycle-intensive operations for the host processor. When such a co-processor is connected as indicated in the apparatus and used as shown in the apparatus, the same data move can be repurposed to achieve data delivery to co-processor and associated memory.

Figure 6:
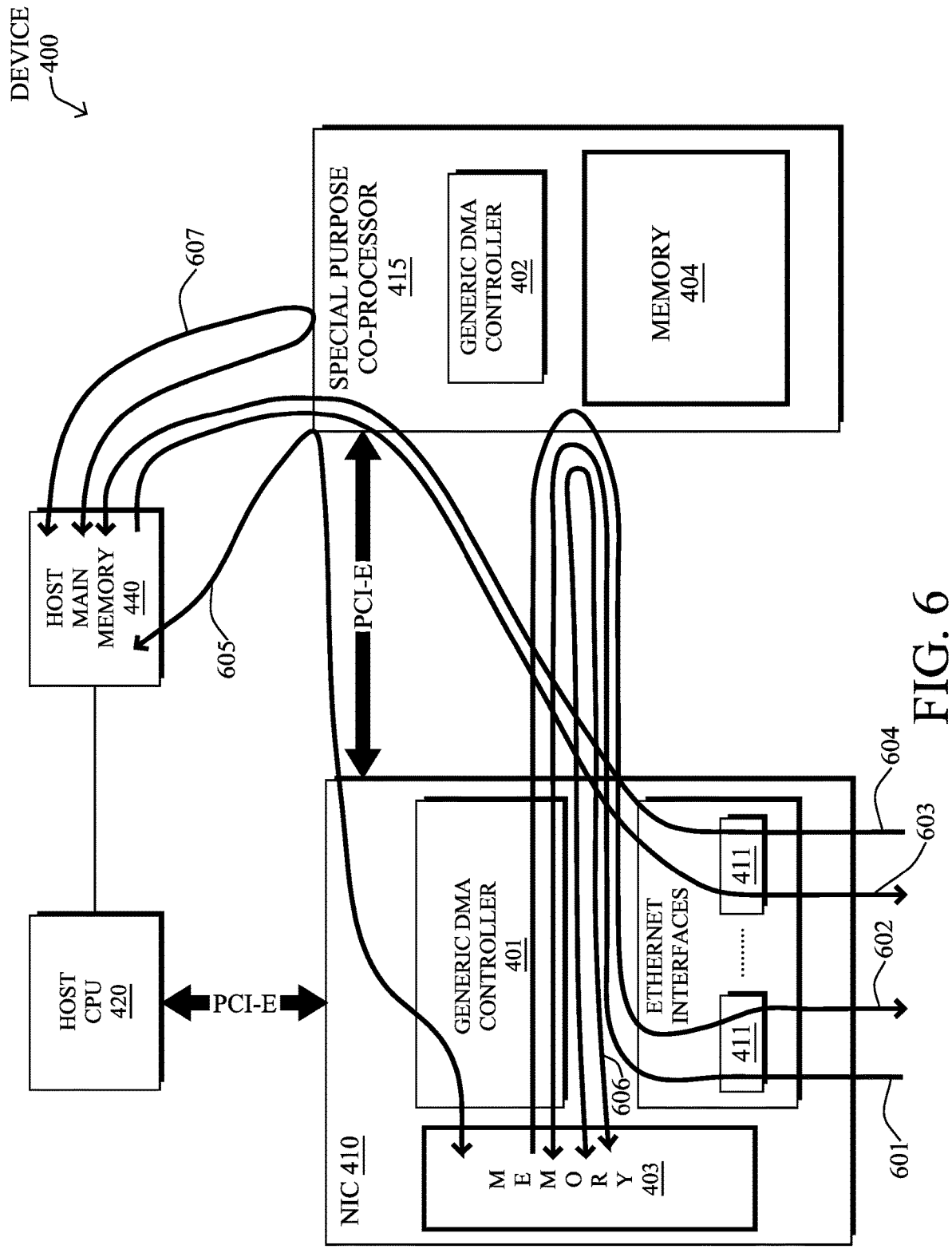
FIG. 6 illustrates an example data movement with special operation according to one or embodiments herein.

FIG. 6 illustrates an example of data movement with special operations according to the techniques herein. In particular, the following list indicates a set of data movements and special operations that can be enabled for achieving many different kinds of applications:

601. Reception of a packet into NIC memory 403 after special operation at the co-processor 415 (e.g., at co-processor memory 404).
602. Transmission of a packet from NIC memory 403 after special operation.
603. Transmission of packet from host memory 440 after special operation.
604. Reception of a packet into host memory 440 after special operation.
605. Data movement from Host, do special op translation and then push data to NIC memory and vice versa.
606. Data movement from NIC memory 403 do special operation and push the translated data to NIC memory 403.
607. Data movement from host memory 440 do the special operation translation of data and push the translated data back to host memory 440.

By supporting these kinds of operations and data movements, the techniques herein are capable of supporting all different applications on a NIC with the co-processor attached as shown in the apparatus. Notably, the host CPU 420 may not even be aware that certain operations have been handed off to the co-processor 415.

Furthermore, in order to accomplish the enhanced data movement, the DMA descriptors have been enhanced to be implemented in the generic DMA controller to achieve data movement with or without special purpose operation performed on a given data set, as described in greater detail below.

—Theory of Operation—

With the above apparatus, it is expected both the end points (NIC and Co-processor) both support controller memory buffer (CMB). The CMB can be carved out appropriately in size to host all the buffer rings that are required for the operation of the network controller exploiting the co-processor.

Figure 7:
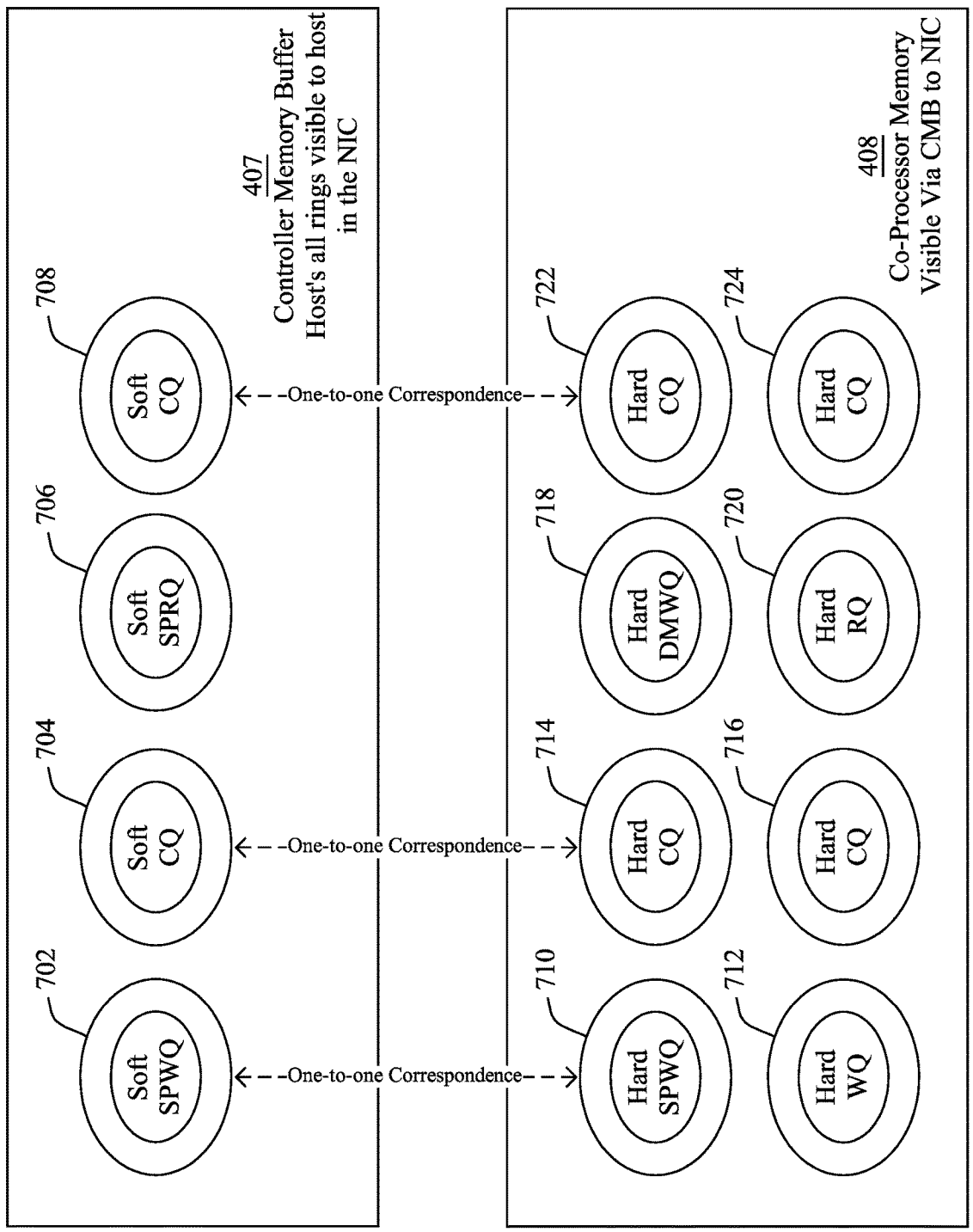
FIG. 7 illustrates an example instantiated buffer rings and their correspondence.

FIG. 7 illustrates an example of buffer rings that have been instantiated and their correspondence. (Note that "soft" means software (only when posting descriptors, as described herein), and "hard" means hardware (not the CPU 420).) The ring organization shown, and examples given herein, may be considered specific for simple encryption/decryption bump-in-wire implementations. As such, the recommended rings are examples only and not necessary for performance of the embodiments herein.

Within CMB 407 of the NIC (which hosts all rings in the NIC visible to the Host CPU 420):

Soft SPWQ 702 is a ring buffer whose descriptor formats are defined subsequently below. Soft SPWQ are software based: they are not scheduled for execution by the hardware, instead they are driven by the host to initiate action. This is achieved by allowing the posted index to be indirectly handled either by the hardware state machine or by processing element. The descriptors posted into this ring buffer describe the Special Purpose operation to be performed by the co-processor before it is transmitted.

Soft CQ 704/708 are ring buffers which indicate the operation requested by the descriptors posted in the Soft SPWQ or Soft SPRQ has been completed successfully or not. The completions are indicated by the interrupt to the host possibly using different Message Signaled Interrupts (MSI) (extended) (MSI-X) vectors for each ring. The descriptor type posted into this queue will precisely identify the operation completed.

Soft SPRQ 706 is a ring buffer which can hold the description of the buffers posted by the host to receive the packets from the special purpose co-processor after completing the operation requested by the descriptor posted into this ring. The completion of the special purpose operation requested and the reception of the packet in the appropriate address with or without error will be indicated via the CQ entry posted in Soft SPCQ.

The following are the types of queues that will be hosted on the controller memory buffer (CMB) 408 of the co-processor 415, which may be an end point to the NIC operating the PCI-E bus in Root Complex (RC) mode.

Hard SPWQ 710 is a ring buffer where the descriptors can be posted. The descriptor format may be the same as what is posted into Soft SPWQ, however, the difference is that in this case the hardware queue scheduler will start the processing of descriptor when the posted index is different from fetch index. In this setup/apparatus, there is a one-to-one correspondence of the ring that is programmed. That is, the same address provided by the host is programmed into the controller registers of the ring that is managed and schedule by hardware.

Hard CQ 714/716/722/724 are ring buffers, the descriptor format being the same as what is posted into the Soft CQ. In this apparatus, there is a one-to-one correspondence between the soft CQ and hard CQ setup, but the same memory address is programmed into the hardware queue control registers and the posted index and fetch index will be managed by the hardware in this case. The descriptor type will indicate what kind of completion has been indicated in this completion. (The completion entry format for various semantics of completion entries are described below.)

Hard DMWQ 718 is a ring buffer which will accept descriptors of specific type which can move data from one memory to another. In this case it could move data from co-processor memory visible as CMB from NIC to host memory pointed to by the next hard SPRQ descriptor.

Hard WQ 712 is a ring buffer which will accept descriptors of specific type which will concoct a header and payload and make a transport packet for transmission, exploiting the CRC and other checksum calculation as enabled for this operation.

Hard RQ 720 is a ring buffer which allows for the reception of the packet which requires special purpose processing (and associated classifier entries to redirect the packet to the co-processor). That is, a packet classifier entry may be configured to direct a packet to Hard RQ, where this hard RQ is filled with special OP buffers which are capable of receiving the packet.

In order to achieve the functionality, the following features have been established herein:

1. Data move from PCI-E to PCI-E either in the same port or across two different ports operating in possibly two different modes (e.g., one in EP Mode and one in RC mode).
2. TCAM 409 should be programmed to route the upstream transaction coming toward RC to the PCI-E interface operating in EP Mode.

Figure 8:
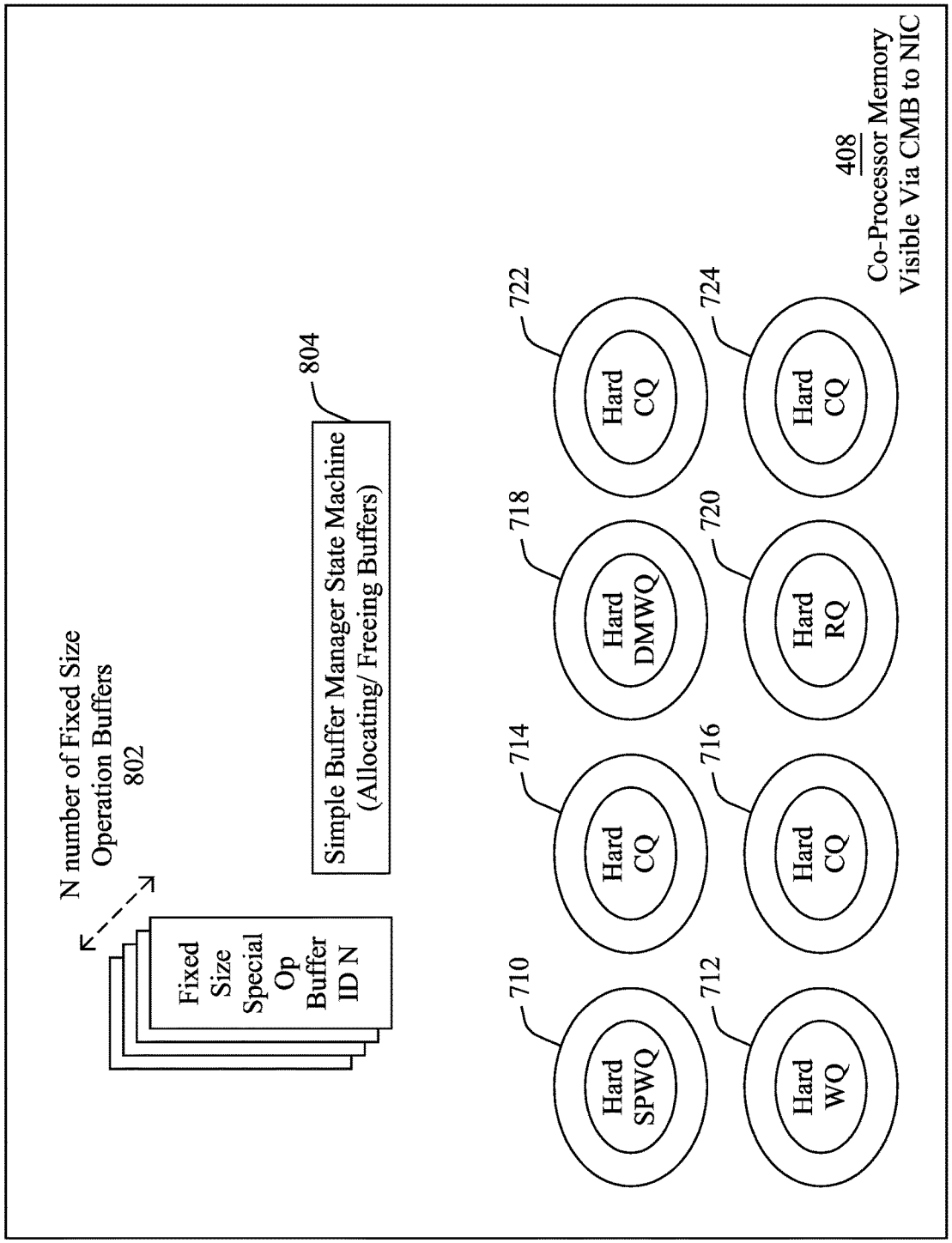
FIG. 8 illustrates an example of co-processor controller memory buffer (CMB) details.

According to one or more embodiments herein, and as shown in FIG. 8, the co-processor, other than hosting the ring buffers as listed above, may also host the fixed size special operation buffers 802, which may be at least the max MTU that transport expects, but could be bigger than the max MTU. These are also exposed on the CMB as they can be addressed using the NIC's address space. These buffers may be used for staging data before and after the special operation and also can be used for transmitting and receiving packets. Since this co-processor deals with high speed data movement, it is recommended to use an appropriate amount of SRAM to support this functionality, and corresponding buffer manager state machine(s) 804 for allocating and freeing buffers.

—Transmission Steps—

The following transmission use case illustrates how the model described above would operate. Note that the following list assumes all the queues are setup appropriately and the correspondence required has been established with firmware API's before any transmission can happen. The host programs the following:

1. Programs the Soft SPWQ with a descriptor which describes the header of the packet followed by the Payload which requires encryption using a specific key possibly represented by the key ID. This key ID could be used to identify the key that is stored in that ID slots based on the authentication done by software. (The interface to store the keys is beyond the scope of this disclosure.)
2. Writes the posted index into the posted index register for this soft SPWQ. This posted index Write from host is handled as indirect and the indirect handler is setup to write the posted index of the corresponding hardware SPWQ. This assumes the start address of the Soft SPWQ is what is programmed as the Start address for the Hard SPWQ as well. By allowing the indirect handler to write the posted index of the hard SPWQ control register, the processor involvement is completely mitigated.
3. The hardware schedules the hard SPWQ for scheduling the Operation. This will fetch the descriptor from hard SPWQ which is in theory the same as soft SPWQ because of the 1-to-1 correspondence setup.
4. Co-processor works on concocting the packet that requires to be transmitted with additional headers (if required) and also schedules the operation to encrypt the payload with the key identified and store the result in a different special Op buffer. (The details about the interface of how it schedules an encryption operation is beyond the scope of this disclosure—that is, this disclosure is specifically focused on describing the different rings and how the generic DMA engine is implemented in NIC and co-processor.)
5. When the special operation (in this case encryption) is complete, the same buffer address as visible to NIC is programmed into Hard WQ which is used for transmitting the packet out after the encryption is done. The posted index of the Hard WQ is written by the co-processor for the NIC to start working on transmitting the packet with all the checksum and other CRC calculation required for this protocol of choice. This Hard WQ is a ring which is scheduled by the generic DMA controller implementation in NIC. However, the physical ring is located on the CMB of the co-processor for visibility to both hardware.
6. After the transmission, the Hard WQ operation will post the transmission completion status into hard CQ, since this hard CQ has one to one correspondence to Soft CQ, the completion information is reflected in the host and interrupt generated using the assigned MSI-X vector.

—Reception Steps—

The reception of the packet which requires special purpose processing requires classifier entries to redirect the packet to co-processor. As noted above, this disclosure assumes that such packet classifier entry is set up to direct the packet to Hard RQ, and that this hard RQ is filled with special OP buffers which are capable of receiving the packet. The following reception use case illustrates how the model described above would operate:

1. Upon reception of the packet by the network interface, the classifier understands this packet requires special operation and redirects the packet to the appropriate Hard RQ which is filled with all Special Purpose Op Buffers as receive buffers.
2. The NIC, after redirecting the packet to Hard RQ, will post the completion queue entry to indicate the reception status and other checksum and CRC validated good if the packet is not errored.
3. Upon writing the completion entry a door bell register (an interrupt as will be understood by those skilled in the art) for the co-processor is rung to initiate processing the received packet. This operation to ring the door-bell need to be initiated by the processing element on NIC for every packet that is received.
4. Upon seeing the doorbell request, the processing element in the co-processor initiates the special purpose processing by extracting the payload to be decrypted and then using the receive buffers pointed in the Hard SPRQ.
5. The processing element on the co-processor will set up the data move descriptor in the Hard Data Move WQ and increments the posted index for it. This triggers the hardware to process the data as requested by the descriptor as well as work on the special operation requested before the data move to the destination address.

6. When the data move is completed along with special operation requested, the completion queue entry is posted into the associated Hard CQ. This entry indicates the completion of the Special Op as well as the data move. That is validated before the Hard CQ which has one to correspondence with Soft CQ is posted and interrupt generated.

—Descriptor Formats and Semantics—

The following description illustrates examples of the different descriptors that may be used to implement functionality of the co-processor. Note that the generic DMA controller can process different descriptors, and can be implemented both in the NIC as well as the co-processor. Also, the generic descriptor format described below is for all types of queues. However, some of the queue types dictate the descriptor and the opcodes that can be set in the descriptor posted to it. (If the appropriate opcode and the right set of parameters are not given, the techniques herein could stop processing the queue and throw an error with an appropriate error code.)

Figure 9:
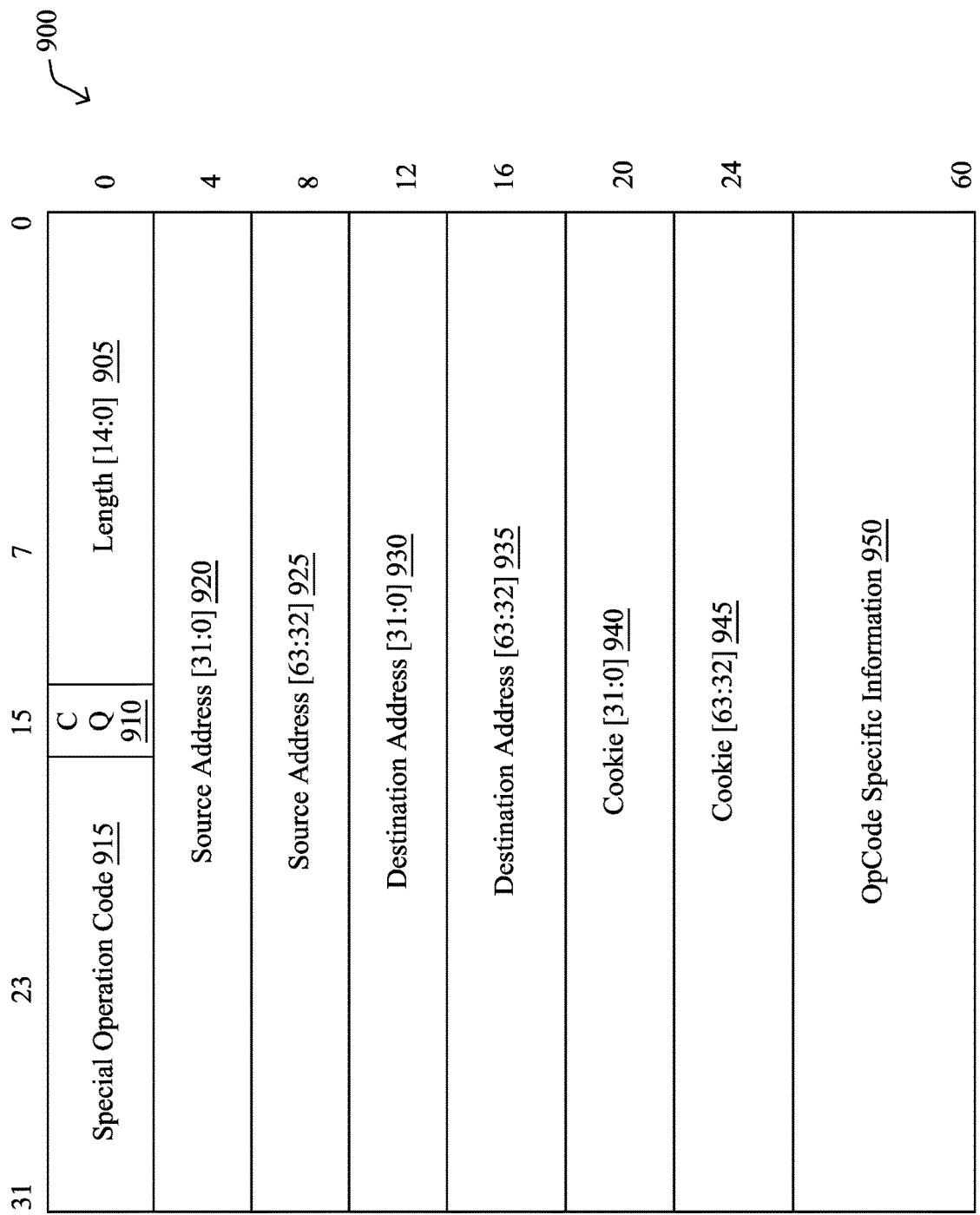
FIG. 9 illustrates an example generic special operation descriptor format.

FIG. 9 illustrates an example generic special op descriptor format 900 (i.e., the descriptor format defined for the special operation request), which can be posted on both the DMWQ, SPWQ, and SPRQ.

The following provides the example semantics of each field:
- 905: Length (e.g., 15 bits)—The amount of data to be moved in bytes or used for the special operation requested. If the length is set to zero, then the data move is assumed to be for 16K.
- 910: CQ (e.g., 1 bit)—Expects a completion with CQ entry.
- 915: Operation Code (e.g., 16 bits)—The following are example known Op Codes:
  - 0x00—NOP;
  - 0x01—Transmit data;
  - 0x02—Transmit Data after Special Operation;
  - 0x03—Receive Data;
  - 0x04—Receive Data after Special Operation;
  - 0x05—Data Move; and
  - 0x06—Data Move After Special Operation.
- 920-925: Source Address (e.g., 64 bits)—Source address pointer from which a transmission needs to happen, or data should be moved.
- 930-935: Destination Address (e.g., 64 bits)—Destination address where the data needs to be received (either for packet reception or where the data need to be placed in case of data move).
- 940-945: Cookie (e.g., 64 bits)—A reference deposited into descriptor which is copied into CQ entry to indicate completion. (Note that if software is requesting, then this reference may be used to pair requests.)
- 950: OpCode Specific Information (e.g., Up to 64 bytes of descriptor size). For opcodes which do not expect any special op to be performed, this need to be filled with zeros.

Figure 10:
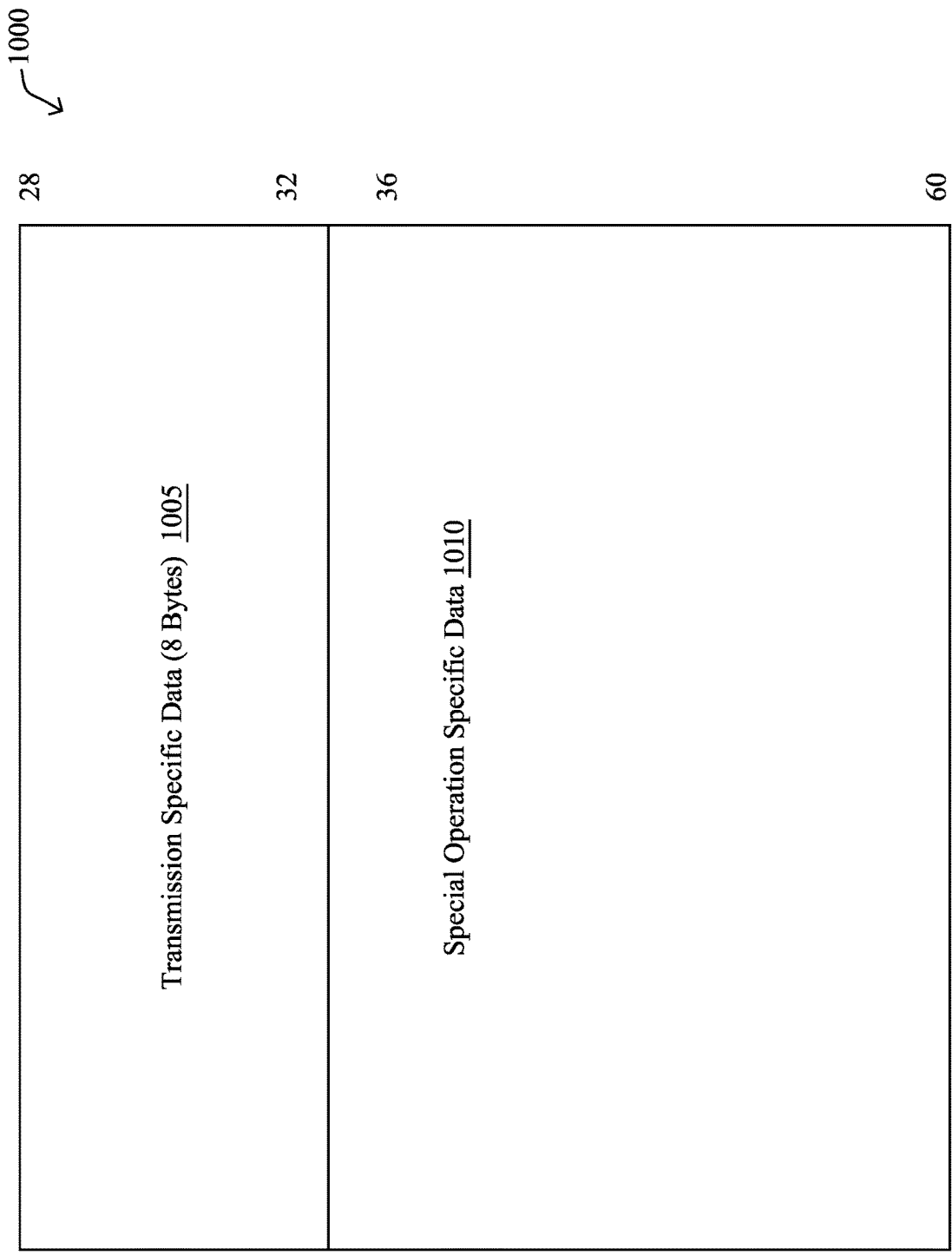
FIG. 10 illustrates an example opcode specific information format.

Depending on the Opcode selected, the Opcode Specific information 950 will follow the format 1000 shown in FIG. 10. Namely, the opcode specific format is specified such that if the opcode involves transmission then the Transmission Specific information 1005 follows first before the special operation specific information 1010 is specified.

Figure 11:
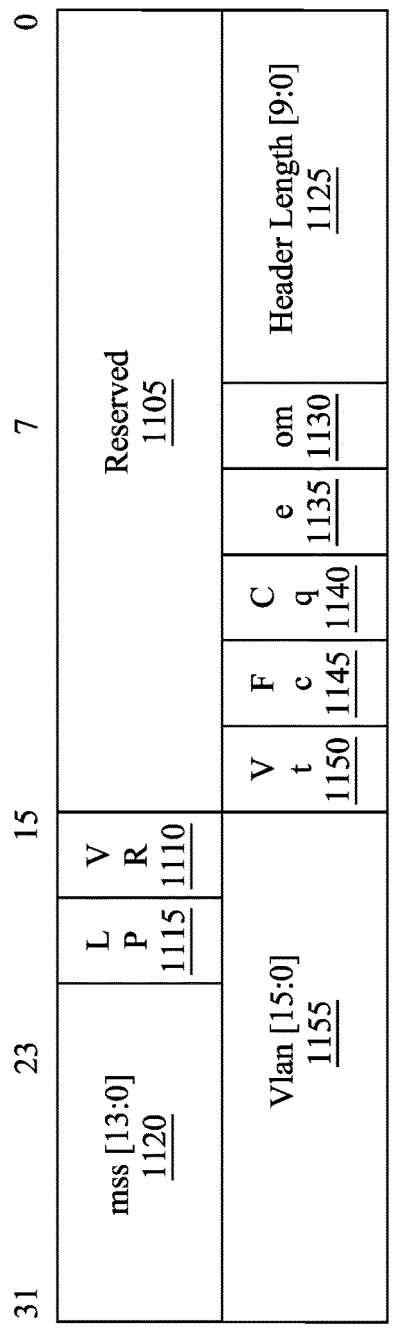
FIG. 11 illustrates an example transmission specific information format.

The transmission specific information itself may have the format 1100 as shown in FIG. 11. In particular, the following items are illustrative semantics of the fields specified in transmission specific information 1100 (described out of numerical order for clarity):
- 1135: "e" or eop (e.g., 1 bit)—End of packet flag, indicates this buffer is the last in the packet. The SOP, or start of packet, is inferred for the next descriptor.
- 1130: "om" or offload_mode (e.g., 2 bits)—Controls offload control with set values (only checked for SOP descriptors):
  - 00: calculate and insert IP and/or UDP/TCP checksum in the header according to bits in mss field 1120. IP checksum calculated only for IPv4 packets.
  - 01: reserved.
  - 10: calculate 16-bit one's complement of checksum from start of data (see header_length 1125) to end of packet and insert checksum field. Partial checksum of pseudo-header and IP checksum (for IPv4) already calculated and inserted by OS.
  - 11: Enable TSO/LSO/GSO for IPv4 and IPv6. The mss field 1120 provides the Maximum Segment Size in bytes; header_length field 1125 provides the length in bytes of the Ethernet, IP, and TCP headers, including IP/TCP options and IP extensions.
- 1120: "mss" (or checksum offset/csum_offload) (e.g., 14 bits)—The maximum segment size (only checked for SOP descriptors). For offload_mode 00, indicates whether IP and/or TCP/UDP checksums should be offloaded:
  - mss[0]: insert IP checksum;
  - mss[1]: insert TCP/UDP checksum;
  - mss[2]: hardware will overwrite the IPv4/UDP/TCP checksum fields, calculating from scratch and ignoring the value placed by software—Note that if this bit is clear, software should zero the IPv4 checksum if mss[0] is set and include the partial checksum if mss[1] is set; and
  - mss[3]: hardware will force an nSPI error when sending this packet to the network block, resulting in a stomped FCS CRC.
  For offload_mode 10:
  - mss[9:0] indicates the checksum field offset from the beginning of the packet. mss must not be 0.
  For offload_mode 11, indicates the Maximum Segment Size, in bytes. This must be a non-zero value less than or equal to (MTU-IP_HDR-TCP_HDR). Techniques will segment large packets into smaller packets, replicating headers and providing MSS payload bytes in each segment. The header_length field holds for all segments.
- 1125: header_length (or fc_eof) (e.g., 10 bits)—For offload_mode 00, carries FCoE EOF in bits [7:0] when fcoe_encap is set. For offload_mode 10, indicates the length of Ethernet, and IP headers, including header options and extensions. Header_length must not be 0. For offload_mode 11, indicates the length of Ethernet, IP, and TCP/UDP headers, including header options and extensions. For mode 11, header_length must be less than or equal to the length field of the descriptor. (Only checked for SOP descriptors.)
- 1140: "cq" or cq_entry (e.g., 1 bit)—Indicates a completion queue entry should be created for this descriptor. For example, if software wants a completion indication for every packet, this bit should be set when EOP is set. (Only checked for EOP descriptors.)

1145: "fc" or fcoe_encap/roce_encap/overlay_encap (a.k.a. encap_enable) (e.g., 1 bit)—Packet encapsulation/overlay offload enabled. Note that overlays can also be enabled by setting a CEG.overlay_offload bit. (Only checked for SOP descriptors.)

Overlay Encapsulation: software driver must create a fully formed overlay packet, including inner and outer headers. The inner packet offloads will be performed according to the descriptor offload_mode, the outer packet offloads will be performed according to the outer header format in the frame.

ROCE Encapsulation: Hardware will generate ROCE CRC and append to the frame if the parser determines the frame is type ROCE, v1 or v2.

FCoE Encapsulation: Hardware will generate FC CRC and add the EOF marker from the descriptor to the raw FCoE frame. Software places the Ethernet header, including SOF marker, in the data buffer. Set offload_mode=0 for ROCE.

For FCoE encap, set offload_mode=0 and mss=0, else this bit will be ignored (TSO and FCoE are not supported together). The header_length[7:0] field contains the EOF symbol, which will be placed in the FCoE header.

1155: "Vlan" or vlan_tag (e.g., 16 bits)—VLAN tag to be inserted in the packet header, e.g., attached/removed automatically by hardware. (Only checked for SOP descriptors.) Note that this inserted VLAN tag does not count against the 9000 byte packet size limit. If the loopback bit is set and the loopback_enable register is set for this WQ, this field determines the destination RQ. The RQ is specified as:

vlan_tag[15]=reserved;

vlan_tag[14:4]=loopback_lif[10:0]; and vlan_tag[3:0]=loopback_rq[3:0] (this is the rq offset within the LIF for FC LIFs only. Enet LIFs will select their RQ based on RSS and classification results).

1150: "vt" or vlan_tag_insert (e.g., 1 bit)—If set, insert the vlan_tag field into the Ethernet header. This bit is ignored of loopback and loopback_enable are set. (Only checked for SOP descriptors.)

1115: "LP" or loopback (e.g., 1 bit)—If set and if the loopback_enable register for this WQ is set the packet will locally loop back to a LIF identified by the vlan_tag field. Loopback must be set for all descriptors which make up a loopback packet.

1110: "vr" or version (e.g., 1 bit)—Descriptor version. For techniques herein, this may be set to 0. (If this is set to 1, the WQ will be disabled and the error_status register will show incompatible version) (Only checked for SOP descriptors.)

1105: Reserved (e.g., 16 bits).

FIG. 12 illustrates an example format 1200 for Special Operation Specific Data. In particular, the following description provides example semantics of different sub-codes and information that need to passed for each sub-code and other information pertaining to such special operations:

1205: Special op Sub Code (e.g., 16 bits)—This field indicates what kind special Operation need to be performed, for example:

0x01-NOP;

0x02—ENCRYPT;

0x03—Decrypt;

0x04—Erasure Code;

0x05—Calculate De-dup checksum;

0x06—Compress;

0x07—De-compress;

and so on.

Note: not all operations have been listed. For example, there are private key/public key negotiations require lots of calculation before the key is stored in the key slot with a reference. But this interface is extensible can be extended for various other requirements.

1210: Algorithm (e.g., 8 bits)—Choices on how to manage data. The following are the Algorithms that may be supported by Co-processor (as will be appreciated by those skilled in the art):

0x01—AES-128;

0x02—AES-196;

0x03—AES-256;

0x04—RSA;

0x05—Elliptic Curve Crypto;

0x06—SHA-2;

0x07—SHA-3;

0x08—Deflate;

0x09-zlib;

0x0a-GZIP;

0x0b—Bit wise XOR; and

0x0C—Generate Random Nonce.

1220: Key Store Reference (e.g., 32 bits)—It is assumed that the Co-processor could support many connections and each connection could generate different key (e.g., negotiating different keys), therefore the key store is assumed to be fairly large to save the negotiated key for that session, using the obfuscated private key, which is available in OTP. This reference could be key ID pointing to a slot where the key is stored for this connection in key store.

1225-1230: Second Source Buffer (e.g., 64 bits)—Could carry various data depending on the context in which it is used. For example, in the case of Erasure coding using XOR, it could point the second source buffer whose data need to be XOR'ed with data in first source buffer and the XOR parity data is saved in destination address. This is an example, documenting all scenarios is beyond the scope of this document as we focus only on scenarios where generic DMA specification is applicable.

1235: Other information required for certain sub-code and algorithm—Other bytes to the descriptor end (the descriptors are assumed to be of fixed size of 64 bytes). For example, and many options are possible, but this field may contain information for cryptographic operations or other operations to be performed before getting the key.

Figure 13:
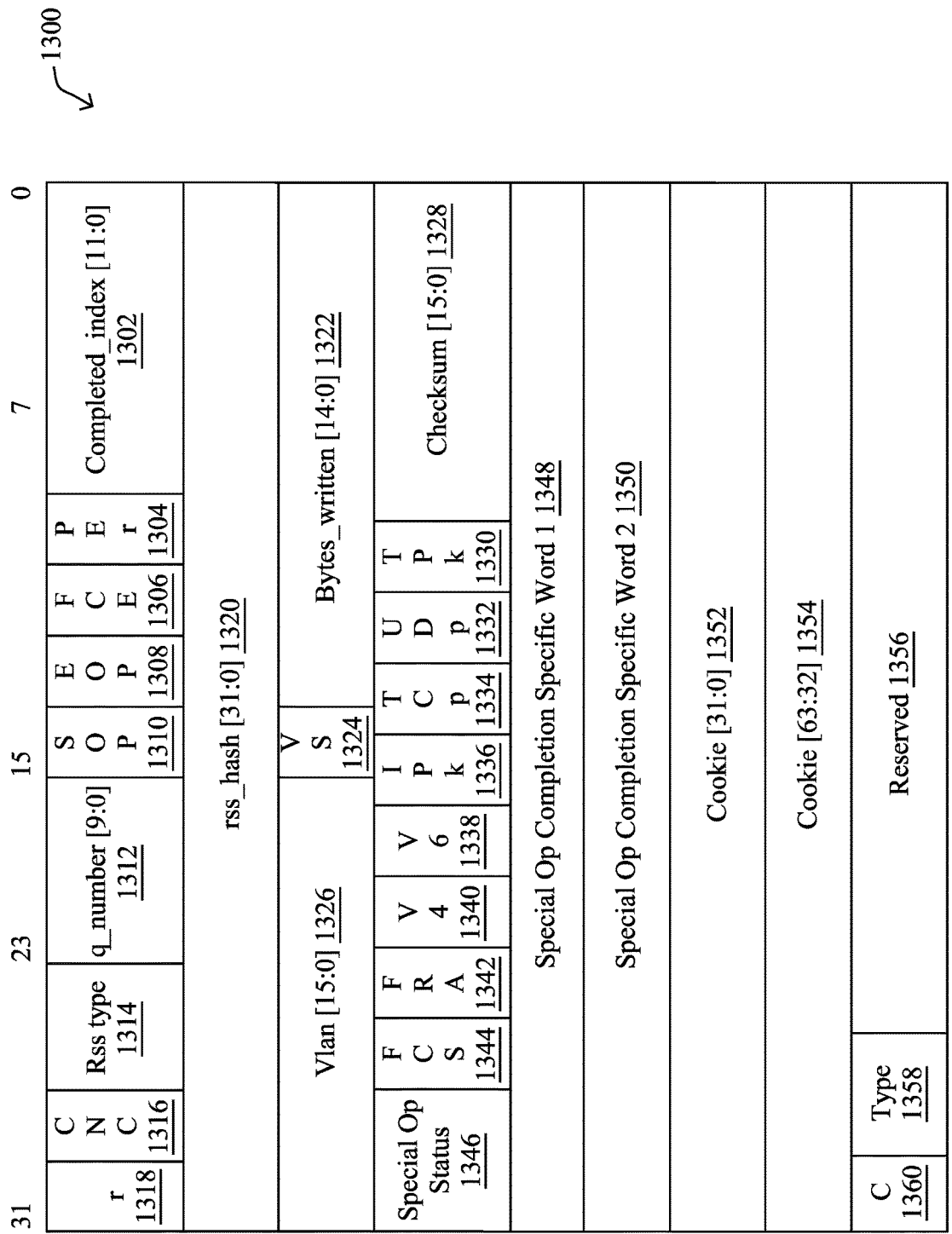
FIG. 13 illustrates an example completion entry format.

FIG. 13 illustrates an example Completion Queue Descriptor Format 1300. For every special operation completed, the techniques herein will generate a completion queue entry. Example semantics of each field of the completion entry format 1300 are described below (described out of numerical order for clarity):

1358: type (e.g., 7 bits)—Type can be set to the following example values (valid on all descriptors):

[6]=0;

[5:4]=EtherChannel ID, indicates the arrival channel ID. This value is derived from the channel_id_map register and the network port ID;

[3:0]=3; Rx Ethernet Completion Entry, or

[3:0]=7; Rx Ethernet Classification Entry (identical to Rx completion entry except that rss_hash is replaced by filter_id);

[3:0]=8; Rx Direct Descriptor Entry;

[3:0]=15 Special Op Completion Descriptor.

1360: "C" or color (e.g., 1 bit)—Hardware writes color bit, inverts each time around the completion ring. Valid on all descriptors.

1312: q number (e.g., 10 bits)—The queue number which is associated with the completion. Valid on all descriptors.

1302: completed index (e.g., 12 bits)—Index of the descriptor corresponding to this completion queue entry. Valid on all descriptors.

1322: bytes_written (e.g., 14 bits)—Number of bytes written to the Rx buffer indicated by the completed index field. If SOP and EOP are set, this is also the packet length, excluding the 4 byte FCS. For a packet which spans multiple buffers, software most add the bytes written field to the size of non-EOP descriptors to determine the packet length. In the event of a packet truncation due to insufficient RQ descriptors, the packet_error flag is set and the bytes_written field is set to 0. If a data move is requested this will indicate the amount of data move successfully completed. Valid on all descriptors.

1310: sop "start of packet" (e.g., 1 bit)—This buffer starts with the first byte of the packet. Valid on all descriptors.

1308: eop "end of packet" (e.g., 1 bit)—This buffer ends with the last byte of the packet. Valid on all descriptors.

1340: "V4" or ipv4 (e.g., 1 bit) —Valid only when EOP is set. Values:
0: not an IPv4 packet;
1: IPv4 packet detected.

1338: "V6" or ipv6 (e.g., 1 bit)—Valid only when EOP is set. Values:
0: not an IPv6 packet;
1: IPv6 packet detected.

1316: checksum_not_calc (cnc) (e.g., 1 bit)—Valid only when EOP is set. Values:
0: Checksum calculated normally;
1: Hardware did not calculate checksum.

1336: ipv4_checksum_ok (ipk) (e.g., 1 bit)—For overlay packets, this field contains the AND of the inner and outer packet ipv4_csum_ok. Valid only when EOP and ~checksum_not_calc is set. Values:
0: IPv4 checksum incorrect;
1: IPv4 checksum good.

1342: fragment (FRA) (e.g., 1 bit)—Valid only when EOP is set. Values:
0: not an IP fragment;
1: is an IP fragment.

1334: tcp (e.g., 1 bit)—Valid only when EOP is set. Values:
0: not a TCP packet;
1: TCP packet detected.

1332: udp (e.g., 1 bit)—Overloaded with fc_encap_err, this bit means is_udp unless the parser decodes a true FCOE packet. Valid only when EOP is set. Values:
0: not a UDP packet;
1: UDP packet detected.

1330: "TPk" or tcp_udp_checksum_ok (e.g., 1 bit)—For VXLAN overlay packets, this field contains the AND of inner and outer tcp_udp_checksum_ok. Valid only when EOP and ~checksum_not_calc is set. Values:
0: TCP or UDP checksum incorrect;
1: TCP or UDP checksum good.

1328: checksum (e.g., 16 bits)—IP checksum not valid if checksum_not_calc is set. If fcoe bit is not set, this field contains:
IPv4: the IP payload checksum, excluding padding.
IPv6: the IPv6 header and IPv6 payload, excluding padding.
FCoE: SOF/EOF fields.

1328 (shared): sof/eof (e.g., 16 bits)—Note that this field is overloaded with the checksum field, the meaning if SOF/EOF only for FCOE packets. Valid only when EOP is set. If fcoe bit is set, this field contains SOF/EOF symbols:
[7:0] FCoE SOF;
[15:8] FCoE EOF.

1330 (shared) fc_crc_ok (a.k.a. encap_ok) (e.g., 1 bit)—This field indicates that an encapsulation protocol checksum or CRC is correct. Note that this bit is overloaded with the tcp_udp_checksum_ok bit, this meaning applies when CQ.fcoe is true. Valid only when EOP is set. Depending on the type of encapsulation:
FCOE: the fc_crc value is correct;
ROCEv1: the ROCE CRC value is correct;
ROCEv2: the ROCE CRC value is correct and tcpudp_csum_ok is true;
VXLAN: the outer and inner UDP checksums are correct;
NVGRE: the inner tcpudp_checksum_ok.

1332 (shared): fc_encap_err (e.g., 1 bit)—For true FCoE Packets only, when fcoe is set and the parser really did decode an FCOE packet (otherwise this bit is overloaded with is_udp.) This field indicates that an FC encapsulation error was detected. Valid only when EOP is set.

1306: fcoe (a.k.a. encap) (e.g., 1 bit)—Valid only when EOP is set. Values:
0: Not an encapsulated packet (overlay/ROCE/FCoE);
1: Encapsulated packet (overlay/ROCE/FCoE).

1344: fcs_ok (e.g., 1 bit)—Ethernet Frame CRC is correct. If incorrect, the frame should be discarded. Valid only when EOP is set.

1304: "PEr" or packet_error (e.g., 1 bit)—The packet encountered an error, the associated header and data cannot be trusted. Valid on all descriptors. EOP will also be set for all packet_error events. This bit will always be set if the packet must be discarded for any error condition. Reasons for packet_error include:
no posted descriptors for the packet body after the SOP has been written to a previous descriptor;
a packet spills out of a descriptor and the next descriptor has a type 0;
network block truncated the packet;
MAC detected errors;
Ethernet FCS incorrect;
internal datapath errors detected;
error_inject register was used to create an ingress NSPI error.

1326: vlan (e.g., 16 bits)—Outermost VLAN of the associated packet. Valid on all descriptors.

1324: vlan stripped (VS) (e.g., 1 bit)—Hardware stripped the VLAN tag. Valid on all descriptors.

1320: rss_hash (e.g., 32 bits)—Result of RSS hash algorithm. Valid on all descriptors of type 3.

1314: rss_hash_type (e.g., 4 bits)—RSS Hash Type. Valid only when EOP is set. Values:
15-7: reserved;
6: HASH_TCP_IPv6 EX;
5: HASH_IPv6_EX;
4: HASH_TCP_IPv6;
3: HASH_IPv6;
2: HASH_TCP_IPv4;
1: HASH_IPv4;

0: no hash computed.

1346: Special Op Status (e.g., 8 bits bits)—Example status values:
0X0—Completed with Good Status;
0x01—Errored. The special Op specific information could carry additional details;
and any other suitable value for status as defined by an associated protocol.

1348-1350: Special Op Completion Specific Word 1 & Word 2 (e.g., 64 bits)—Used to indicate operation specific information. This is beyond the scope of this document.

1352-1354 Cookies (e.g., 64 bits).

1318: Reserved (e.g., 1 bit).

1356: Reserved (e.g., 24 bits).

Figure 14:
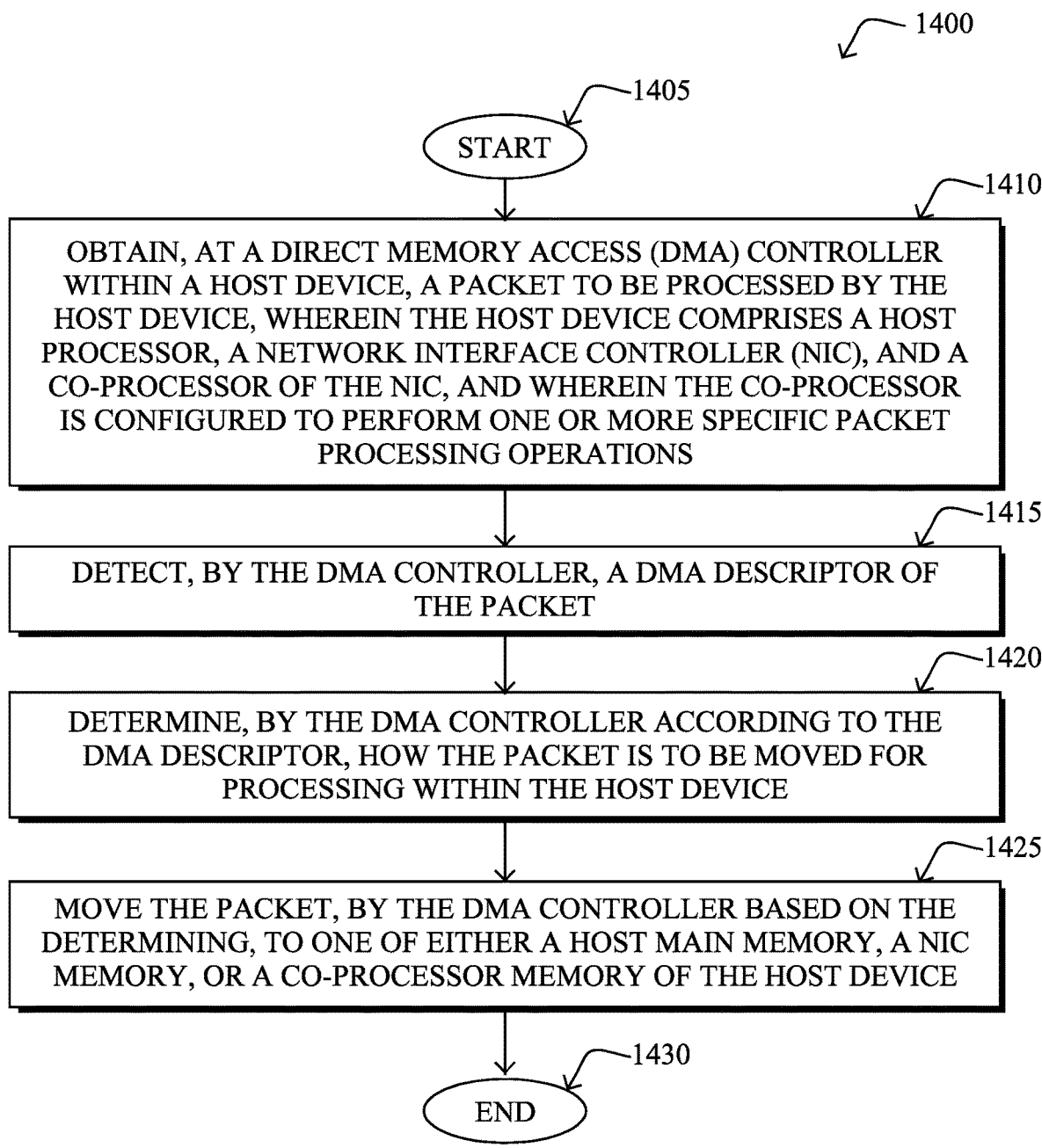
FIG. 14 illustrates an example simplified procedure for offloading data movement for packet processing (e.g., special purpose) in a NIC in accordance with one or more embodiments described herein.

Based on the above description, FIG. 14 illustrates an example simplified procedure for offloading data movement for packet processing (e.g., special purpose) in a NIC in accordance with one or more embodiments described herein. For example, a non-generic, specifically configured device (e.g., specifically with DMA controller 401/402) may perform procedure 1400 by executing stored instructions (e.g., DMA controller process 248). Notably, the DMA controller executing the process, in particular, may be either the DMA controller on the NIC, or the DMA controller on the co-processor (alone or in combination).

The procedure 1400 may start at step 1405, and continues to step 1410, where, as described in greater detail above, the DMA controller, which is within a host device 400, obtains a packet to be processed by the host device. As detailed above, the host device 400 comprises a host processor 420, a network interface controller (NIC) 410, and a co-processor 415 of the NIC, and wherein the co-processor is configured to perform one or more specific packet processing operations. Notably, as described above, the NIC may, though need not, be connected to the host processor by a first peripheral component interconnect express (PCI-E) link, and the co-processor may, though need not, be connected to the NIC by a second PCI-E link. Also, the NIC optionally may be configured to operate in an end-point mode with exposed base address registers (BARs) and controller memory buffer (CMB) within a BAR space, as detailed above.

Illustratively, an example packet (e.g., packet 140) to be processed by the host device may be for Internet Protocol Security (IPSec) processing, redundant array of independent disks (RAID) storage processing, video processing, and so on. As such, the one or more specific packet processing operations may be such things as, e.g., encrypting the packet, decrypting the packet, duplicating the packet, deduplicating the packet, compressing the packet, decompressing the packet, XORing the packet, erasure coding the packet, etc.

In step 1415, the DMA controller may detect a DMA descriptor of the packet, and then in step 1420 determines, according to the DMA descriptor, how the packet is to be moved for processing within the host device. As such, in step 1425, the DMA controller may move the packet, based on the determining, to one of either a host main memory, a NIC memory, or a co-processor memory of the host device (e.g., based on ternary content-addressable memory (TCAM) transactions).

Specifically, as described in detail above, options for how the packet may be moved may comprise:
receiving a packet into the NIC memory 403 after specific packet processing by the co-processor 415;
transmitting a packet from the NIC memory 403 after specific packet processing by the co-processor 415;
transmitting a packet from the host main memory 440 after specific packet processing by the co-processor 415;
receiving a packet into the host main memory 440 after specific packet processing by the co-processor 415;
moving a packet from the host main memory 440 to the co-processor memory 404 for specific packet processing by the co-processor 415 and pushing the resultant processed packet to the NIC memory 403;
moving a packet from the NIC memory 403 to the co-processor memory 404 for specific packet processing by the co-processor 415 and pushing the resultant processed packet to the host main memory 440;
moving a packet from the NIC memory 403 to the co-processor memory 404 for specific packet processing by the co-processor 415 and pushing the resultant processed packet to the NIC memory 403; and
moving a packet from the host main memory 440 to the co-processor memory 404 for specific packet processing by the co-processor 415 and pushing the resultant processed packet to the host main memory 440.

As also described above, in order to enable these operations, the NIC memory and/or co-processor memory may comprise a CMB 407/408 divided into one or more ring buffers as follows:
a soft specific packet processing operations (SP) work queue (WQ) (SPWQ) ring buffer 702;
a soft completion queue (CQ) ring buffer 704/708;
a soft SP receive queue (RQ) (SPRQ) ring buffer 706;
a hard SPWQ ring buffer 710;
a hard CQ ring buffer 714/716/722/724;
a hard RQ ring buffer 720;
a hard WQ ring buffer 712; and
a hard data movement WQ (DMWQ) ring buffer 718.

The illustrative simplified procedure 1400 may then end in step 1430, notably with the option to continue receiving and moving data/packets accordingly.

It should be noted that while certain steps within procedure 1400 may be optional as described above, the steps shown in FIG. 14 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, offload data movement for packet processing in a NIC, particularly special operation processing. In particular, the techniques herein allow for completing specialized operations (e.g., secure operations, high-speed storage, high-speed video, etc.), before the packet needs to be transmitted or received without processor involvement through the detailed use of a co-processor attachment that makes data movement happen without any processor element involvement. For example, special operations that can be accomplished through the techniques herein without needing to involve the main/primary host processor are such things as encryption/decryption, compression/de-compression, XOR/Erasure coding, duplication/de-duplication, and so on.

While there have been shown and described illustrative embodiments that provide for offloading data movement for packet processing (e.g., special purpose) in a NIC, it is to be understood that various other adaptations and modifications may be made within the intent and scope of the embodiments herein. For example, while certain embodiments are described herein with respect to using certain types of memory or memory protocols, the embodiments herein are not limited as such and may be used with other types of memory, in other embodiments. In addition, while certain network protocols may have been shown, described, or implied, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
    obtaining, at a direct memory access (DMA) controller within a host device comprising a host main memory, a packet to be processed by the host device, wherein the host device comprises: a) a host processor, b) a network interface controller (NIC) comprising a NIC memory, and c) a co-processor of the NIC that comprises a co-processor memory that is separate from the NIC memory and configured to store data for processing by the co-processor, the co-processor memory including a base address register (BAR) space and a controller memory buffer, and wherein the co-processor is configured to perform one or more specific packet processing operations using the co-processor memory;
    detecting, by the DMA controller, a DMA descriptor of the packet;
    determining, by the DMA controller according to the DMA descriptor, how the packet is to be moved for processing within the host device; and
    moving the packet, by the DMA controller based on the determining, to one of the host main memory, the NIC memory, or the co-processor memory of the host device.

2. The method as in claim 1, wherein how the packet is to be moved is selected from a group consisting of:
    receiving a packet into the NIC memory after specific packet processing by the co-processor;
    transmitting a packet from the NIC memory after specific packet processing by the co-processor;
    transmitting a packet from the host main memory after specific packet processing by the co-processor;
    receiving a packet into the host main memory after specific packet processing by the co-processor;
    moving a packet from the host main memory to the co-processor memory for specific packet processing by the co-processor and pushing a resultant processed packet from the specific packet processing to the NIC memory;
    moving a packet from the NIC memory to the co-processor memory for specific packet processing by the co-processor and pushing the resultant processed packet to the host main memory;
    moving a packet from the NIC memory to the co-processor memory for specific packet processing by the co-processor and pushing the resultant processed packet; and
    moving a packet from the host main memory to the co-processor memory for specific packet processing by the co-processor and pushing the resultant processed packet to the host main memory.

3. The method as in claim 1, wherein the DMA controller is on the NIC.

4. The method as in claim 1, wherein the DMA controller is on the co-processor.

5. The method as in claim 1, wherein the one or more specific packet processing operations are selected from a group consisting of: encrypting the packet; decrypting the packet; duplicating the packet; deduplicating the packet; compressing the packet; decompressing the packet; XORing the packet; and erasure coding the packet.

6. The method as in claim 1, wherein the NIC is connected to the host processor by a first peripheral component interconnect express (PCI-E) link, and wherein the co-processor is connected to the NIC by a second PCI-E link.

7. The method as in claim 1, wherein the NIC operates in end-point mode with exposed base address registers (BARs) and controller memory buffer (CMB) within a BAR space.

8. The method as in claim 1, wherein at least the NIC memory and co-processor memory comprise a controller memory buffer (CMB) divided into ring buffers comprising one or more of:
    a soft specific packet processing operations (SP) work queue (WQ) (SPWQ) ring buffer;
    a soft completion queue (CQ) ring buffer;
    a soft SP receive queue (RQ) (SPRQ) ring buffer;
    a hard SPWQ ring buffer;
    a hard CQ ring buffer;
    a hard RQ ring buffer;
    a hard WQ ring buffer; and
    a hard data movement WQ (DMWQ) ring buffer.

9. The method as in claim 1, wherein the packet is to be processed by the host device for one or more of Internet Protocol Security (IPSec) processing, redundant array of independent disks (RAID) storage processing, and video processing.

10. The method as in claim 1, wherein moving the packet is based on ternary content-addressable memory (TCAM) transactions.

11. An apparatus, comprising:
    a host processor configured to execute one or more processes;
    a host main memory configured to store data for processing by the host processor;
    a network interface controller (NIC) coupled to the host processor and configured to communicate with a network, the NIC comprising:
        a) a NIC processor configured to execute one or more processes,
        b) a NIC memory configured to store data for processing by the NIC processor, and
        c) a co-processor configured to perform one or more specific packet processing operations using a co-processor memory, the co-processor comprising the co-processor memory that is separate from the NIC memory and configured to store data for processing by the co-processor, the co-processor memory including a base address register (BAR) space and a controller memory buffer; and
    a direct memory access (DMA) controller configured to:

obtain a packet to be processed by the apparatus;
detect a DMA descriptor of the packet;
determine, according to the DMA descriptor, how the packet is to be moved for processing within the apparatus; and
move the packet, based on the determining, to one of the host main memory, the NIC memory, or the co-processor memory.

12. The apparatus as in claim 11, wherein how the packet is to be moved is selected from a group consisting of:
receiving a packet into the NIC memory after specific packet processing by the co-processor;
transmitting a packet from the NIC memory after specific packet processing by the co-processor;
transmitting a packet from the host main memory after specific packet processing by the co-processor;
receiving a packet into the host main memory after specific packet processing by the co-processor;
moving a packet from the host main memory to the co-processor memory for specific packet processing by the co-processor and pushing a resultant processed packet from the specific packet processing;
moving a packet from the NIC memory to the co-processor memory for specific packet processing by the co-processor and pushing the resultant processed packet to the host main memory;
moving a packet from the NIC memory to the co-processor memory for specific packet processing by the co-processor and pushing the resultant processed packet to the NIC memory; and
moving a packet from the host main memory to the co-processor memory for specific packet processing by the co-processor and pushing the resultant processed packet to the host main memory.

13. The apparatus as in claim 11, wherein the DMA controller is on the NIC.

14. The apparatus as in claim 11, wherein the DMA controller is on the co-processor.

15. The apparatus as in claim 11, wherein the one or more specific packet processing operations are selected from a group consisting of: encrypting the packet; decrypting the packet; duplicating the packet; deduplicating the packet; compressing the packet; decompressing the packet; XORing the packet; and erasure coding the packet.

16. The apparatus as in claim 11, wherein the NIC is connected to the host processor by a first peripheral component interconnect express (PCI-E) link, and wherein the co-processor is connected to the NIC by a second PCI-E link.

17. The apparatus as in claim 11, wherein the NIC operates in end-point mode with exposed base address registers (BARs) and controller memory buffer (CMB) within a BAR space.

18. The apparatus as in claim 11, wherein at least the NIC memory and co-processor memory comprise a controller memory buffer (CMB) divided into ring buffers comprising one or more of:
a soft specific packet processing operations (SP) work queue (WQ) (SPWQ) ring buffer;
a soft completion queue (CQ) ring buffer;
a soft SP receive queue (RQ) (SPRQ) ring buffer;
a hard SPWQ ring buffer;
a hard CQ ring buffer;
a hard RQ ring buffer;
a hard WQ ring buffer; and
a hard data movement WQ (DMWQ) ring buffer.

19. A tangible, non-transitory, computer-readable medium storing program instructions that cause a computer to execute a direct memory access (DMA) controller process, comprising:
obtaining a packet to be processed by a host device comprising a host main memory, wherein the host device comprises: a) a host processor, b) a network interface controller (NIC) comprising a NIC memory, and c) a co-processor of the NIC that comprises a co-processor memory that is separate from the NIC memory and configured to store data for processing by the co-processor, the co-processor memory including a base address register (BAR) space and a controller memory buffer, and wherein the co-processor is configured to perform one or more specific packet processing operations using the co-processor memory;
detecting a DMA descriptor of the packet;
determining, according to the DMA descriptor, how the packet is to be moved for processing within the host device; and
moving the packet, based on the determining, to one of either the host main memory, the NIC memory, or the co-processor memory of the host device.

20. The computer-readable medium as in claim 19, wherein how the packet is to be moved is selected from a group consisting of:
receiving a packet into the NIC memory after specific packet processing by the co-processor;
transmitting a packet from the NIC memory after specific packet processing by the co-processor;
transmitting a packet from the host main memory after specific packet processing by the co-processor;
receiving a packet into the host main memory after specific packet processing by the co-processor;
moving a packet from the host main memory to the co-processor memory for specific packet processing by the co-processor and pushing a resultant processed packet of the specific packet processing to the NIC memory;
moving a packet from the NIC memory to the co-processor memory for specific packet processing by the co-processor and pushing the resultant processed packet to the host main memory;
moving a packet from the NIC memory to the co-processor memory for specific packet processing by the co-processor and pushing the resultant processed packet to the NIC memory; and
moving a packet from the host main memory to the co-processor memory for specific packet processing by the co-processor and pushing the resultant processed packet to the host main memory.

* * * * *

UNITED STATES PATENT AND TRADEMARK OFFICE
CERTIFICATE OF CORRECTION

PATENT NO. : 10,884,960 B2  
APPLICATION NO. : 16/389040  
DATED : January 5, 2021  
INVENTOR(S) : Tanjore K. Suresh et al.

Page 1 of 1

It is certified that error appears in the above-identified patent and that said Letters Patent is hereby corrected as shown below:

In the Specification

Column 13, Line 51, please amend as shown:
will show incompatible version.) (Only checked for Column 17, Line 4, please amend as shown:
0x0—Completed with Good Status;

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*